(12) United States Patent
Kotlarski

(10) Patent No.: US 6,434,780 B1
(45) Date of Patent: Aug. 20, 2002

(54) DEVICE FOR CONNECTING A WIPER BLADE TO A WIPER ARM

(75) Inventor: Thomas Kotlarski, Bad Neuenahr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,195

(22) PCT Filed: Aug. 4, 1999

(86) PCT No.: PCT/DE99/02422

§ 371 (c)(1),
(2), (4) Date: Jun. 16, 2000

(87) PCT Pub. No.: WO00/12360

PCT Pub. Date: Mar. 9, 2000

(30) Foreign Application Priority Data

Aug. 27, 1998 (DE) .......................................... 198 38 883

(51) Int. Cl.⁷ ................................................. B60S 1/40
(52) U.S. Cl. .................................. 15/250.32; 15/250.43
(58) Field of Search ......................... 15/250.32, 250.31, 15/250.361, 250.43, 250.44; 403/324, 325, 327

(56) References Cited

U.S. PATENT DOCUMENTS

| | | |
|---|---|---|
| 3,872,537 A | 3/1975 | Bianchi |
| 4,114,227 A * | 9/1978 | Blackman ................. 15/250.32 |
| 4,120,069 A | 10/1978 | Sharp |
| 4,144,613 A * | 3/1979 | Wubbe ..................... 15/250.32 |
| 6,209,166 B1 * | 4/2001 | Westermann et al. .... 15/250.32 |

FOREIGN PATENT DOCUMENTS

| | | | |
|---|---|---|---|
| DE | 2 344 876 | 3/1974 | |
| DE | 297 12 293 U | 11/1998 | |
| EP | 625454 | * 11/1994 | .............. 15/250.32 |
| FR | 2695093 | * 3/1994 | .............. 15/250.32 |

* cited by examiner

Primary Examiner—Gary K. Graham
(74) Attorney, Agent, or Firm—Michael J. Striker

(57) ABSTRACT

A device serves as a wiper blade for motor vehicle windows to a wiper arm, which is guided on the wiper blade, is movable between turning point positions, and is provided with a device element (24), with whose device element (24). The elongated wiper blade (10), which can be pressed again the window with a wiper strip (22), is pivotably connected via a connection piece (20) belonging to the wiper blade, wherein one pivot peg (58 and 146, respectively) disposed on the connection piece protrudes from each long side of the wiper blade, the common longitudinal axis of the two pivot pegs is located transversely to the length of the wiper blade in a plane spaced apart from the window, and each of the pivot pegs engages a gearing recess, associated with it, of the connecting element, which gearing recess forms the pivoting means of the wiper arm, it is proposed that at least one pivot peg (58 and 146, respectively) is movable at least in some portions by at least its peg length toward the other pivot peg counter to spring force and can be introduced into the gearing recess (48 and 138, respectively) associated with it.

10 Claims, 2 Drawing Sheets

DEVICE FOR CONNECTING A WIPER BLADE TO A WIPER ARM

BACKGROUND OF THE INVENTION

The invention is based on a device for connecting a wiper blade to a wiper arm. In a known device of this type (Published, Unexamined German Patent Application DE-OS 23 44 876), the pivot pegs toward the blade, once the wiper blade has been installed on the wiper arm, engage receiving holes in the arm. Nothing is said there about the assembly process. Possibly the two pegs are formed by the ends of a bolt that protrude from the block of the holder; the bolt is inserted after the connection parts have been put together, so that the ends of the bolts are located in the holes of the arm. Such a connection requires major effort in assembly, both the first time the wiper blade is mounted on the wiper arm and when it later becomes necessary to replace a wiper blade.

SUMMARY OF THE INVENTION

In the device of the invention the pivot peg can be moved counter to spring force all the way into the inside of the connection piece, making it possible to position the wiper blade relative to the wiper arm in a way suitable for assembly. Once the pivot pegs have been released, they return with the aid of the spring force back to their outset positions, in the process of which they enter the gearing recesses of the connecting element belonging to the wiper arm. For removing the wiper blade from the wiper arm, it suffices to compress the two pivot pegs again counter to spring force far enough that they escape from their gearing recesses. Special loose elements, such as separate pivot bolts, and the attendant assembly steps can thus be omitted.

In a refinement of the concept of the invention, each pivot peg is longitudinally divided; that one peg part of the at least one pivot peg is solidly joined to the connection piece; that the other peg part of the at least one pivot peg is movable counter to spring force by at least the amount of the effective peg length toward the other pivot peg, and each pivot peg part solidly joined to the connection piece can be introduced, via a mounting channel that is open at the periphery and discharges into the gearing recess associated with this pivot peg part, and the width of the mounting channel is adapted to the width of the respective pivot peg part. As a result, connecting the wiper blade to the wiper arm and removing the wiper blade from the wiper arm are simplified further, because the pivot peg part solidly joined to the connection piece already brings about good positioning of the wiper blade on the wiper arm, so that the movable pivot peg part assumes its operating position in its gearing recess practically automatically and under the influence of the spring force.

With a view to the operational reliability of the wiper blade on the wiper arm, it is advantageous if when the wiper arm is in the operating position, the dividing seams existing between the first pivot peg parts and the second pivot peg parts are disposed upright toward the window.

A connection device that is especially easy to install is obtained if the dividing seams are disposed outside the longitudinal axis of the pivot peg; the pivot peg parts having the larger cross section are solidly joined to the connection piece, and the pivot peg parts having the smaller cross section are disposed in at least approximately resiliently yielding fashion in the direction of the longitudinal axes of the pegs, because the larger pivot peg parts bring about better prepositioning of the wiper blade relative to the wiper arm.

With a view to manipulating the connecting device, advantageously, the connection piece is made from a spring—elastic plastic; and the spring means are disposed on the end, which—when the wiper blade is connected to the wiper arm—is remote from the wiper arm, of a base part that belongs to the connection piece and has the pivot peg parts having the larger cross section.

In a further feature of the invention, the spring means for each of the smaller pivot peg parts are formed each by one hairpinlike extension of the connection piece; that the two extensions are located in a common plane spaced apart from and approximately parallel to the window; and the inner hairpin legs, adjacent to one another, of the two extensions are joined solidly, by their ends remote from the respective apex region of the hairpin, to the end of the base part of the connection piece; and the pivot peg parts having the smaller cross section are each disposed on one of the two outer legs of the hairpin of the two extensions, which legs are freely movable counter to spring force. The outer hairpin legs of the extensions joined integrally with the connection piece thus also comprise a spring-elastic plastic and form handles for temporarily deflecting the smaller pivot peg parts by the dimension of the effective peg length. Their disposition on the exposed sides of the connection piece assures accessibility for the sake of easy installation.

In order for the wiper blade to be guided well on the wiper arm in the wiping motion that occurs transversely to the length of the wiper blade, the device element of the wiper arm has a U-shaped cross section, the base of which U, when the wiper blade has been connected, is located on the side of the connection piece remote from the window, and the two legs of the device element fit tightly over the two long sides of the connection piece of the wiper blade, and each leg of the U has one gearing recess for one pivot peg.

An improvement in operating reliability is obtained if the mounting channel of each gearing recess is open toward the window, because the wiper blade can be removed from the wiper arm only when the wiper arm has been lifted away from the window.

The operating safety is still further enhanced in that when the wiper blade has been connected, the walls of the gearing recess that are each remote from the wiper arm fit in hooklike fashion under the pivot pegs.

An especially low, compact structural height of the connection device is obtained in that the base of the U of the device element is provided with a widened portion of L-shaped cross section, one leg of which L is formed by a continuation of the base of the U, while other leg of the L is disposed spaced apart from and parallel to the first leg of the U of the device element.

Further advantageous refinements and features of the invention are disclosed in the ensuing description of exemplary embodiments shown in the accompanying drawing.

DESCRIPTION OF THE PREFERRED EMBODIMENTS

Figure 1:
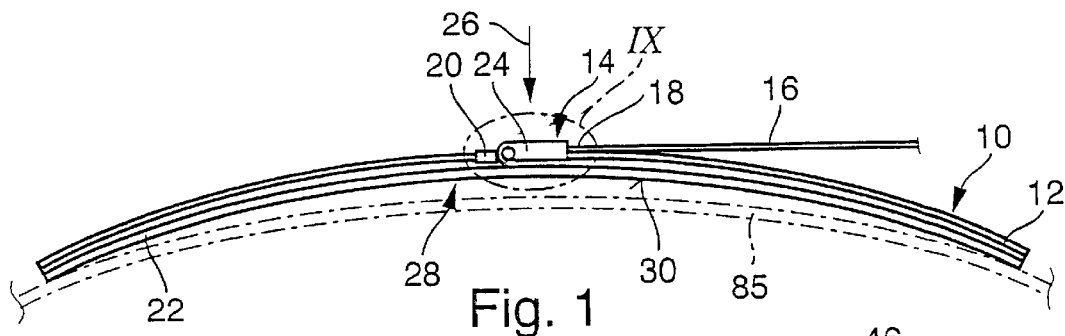
FIG. 1, a side view of a wiper blade connected to a wiper arm.

A wiper blade 10 shown in FIG. 1 has a spring-elastic support element 12 elongated in bandlike fashion, on the top side of which, pointing away from the window to be wiped, a connection piece 20 toward the wiper blade and belonging to a connection device 14 is disposed; with the aid of the connection piece, the wiper blade 10 can be separably joined to a driven wiper arm 16 guided on the body of a motor vehicle. To that end, the wiper arm, on its free end 18, is provided with a device element 24 that also belongs to the connection device 14 or in other words to the wiper arm. On the underside of the support element 12, facing toward the window, an elongated, rubber-elastic wiper strip 22 is disposed parallel to the longitudinal axis. The wiper arm 16 and thus also the device element 24 on the arm end 18, which element cooperates with the wiper blade 10 and is solidly joined to the free end 18 of the connection device 14, is urged in the direction of the arrow 26 toward the window to be wiped, whose surface to be wiped is represented in FIG. 1 by a dot-dashed line 28. Since the dot-dashed line 28 is meant to represent the greatest curvature of the window surface, it is clearly apparent that the curvature of the wiper blade 10, resting with its two ends on the window, is greater than the maximum window curvature (FIG. 1). Under the contact pressure (arrow 26), the wiper blade presses over its full length with its wiper lip 30 against the window surface 26. In the process, a tension builds up in the bandlike, spring-elastic support element 12 that assures for proper contact of the wiper strip 22 or wiper lip 30, over its entire length, against the window of the motor vehicle. Because the window, which as a rule is spherically curved, is not a segment of a spherical surface, the wiper blade 10 must be capable of constantly adapting during its wiping motion to the current location of the window surface 28 relative to the wiper arm 16. The connection device 14 is therefore simultaneously embodied as a pivot connection between the wiper blade and the wiper arm.

Figure 2:
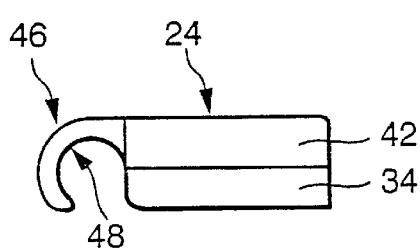
FIG. 2, a side view of the device element of the connection device of the wiper arm, shown enlarged.
Figure 4:
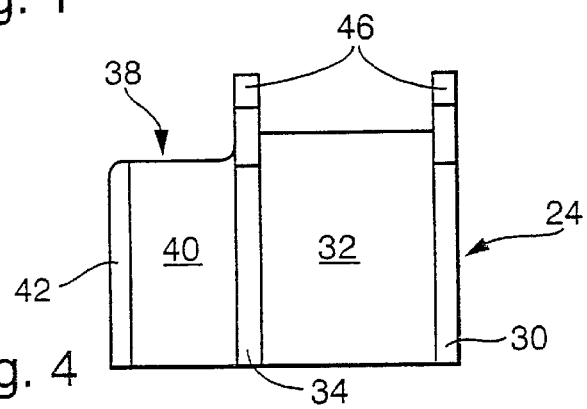
FIG. 4, the device element of FIG. 2 in a view from below.
Figure 3:
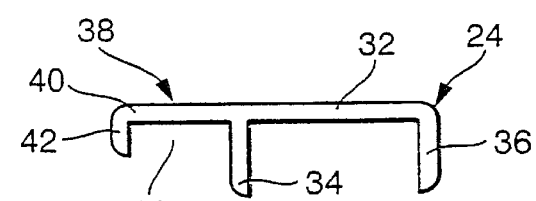
FIG. 3, a front view of the device element of FIG. 2.

The special embodiment of the connection device 14 and of the two device parts 20 and 24 belonging to it will now be described in further detail. The device element 24 (FIGS. 2–4) that can be solidly connected to the wiper arm 16 has a substantially U-shaped cross section (FIG. 3) and thus a platelike base 32 of the U, and this base is adjoined by two spaced-apart legs 34 and 36 of the U. The base 32 of the U of the device element 24 is provided with a lateral widened portion 38 of L-shaped cross section. One leg 40 of the L is a continuation of the base 32 of the U. At a distance from the leg 34 of the U, the leg 40 of the L adjoins the other leg 42 of the L, thus forming a receiving channel 44 for the free end 18 of the wiper arm 16. Each of the legs 34 and 36 of the U extends past the base 32 of the U with an extended portion 46. These extended portions are curved in hooklike fashion, and their inner contours each form bearing recesses 48, whose significance will be addressed in further detail hereinafter.

Figure 7:
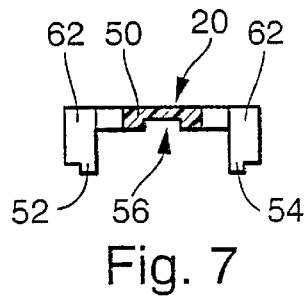
FIG. 7, a section through the connection piece taken along the line VII—VII of FIG. 5.
Figure 5:
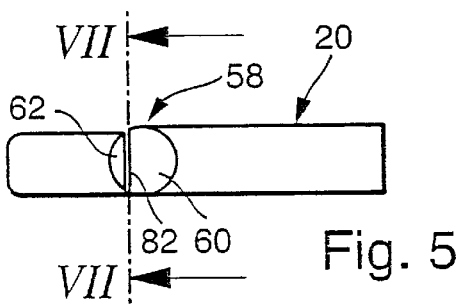
FIG. 5, a side view of the connection piece, toward the wiper blade, of the connection device, shown enlarged.
Figure 6:
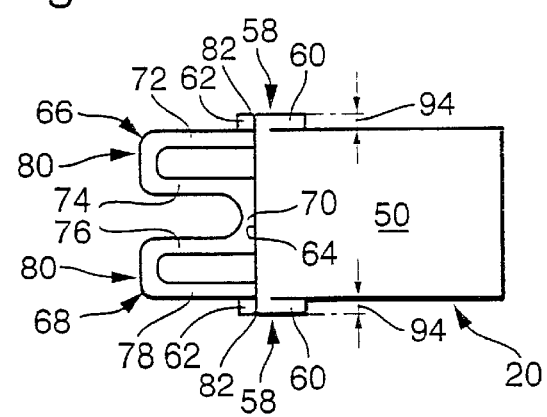
FIG. 6, a plan view on the connection piece of FIG. 5.

The embodiment of the other part, toward the wiper blade, of the connection device 14 will now be explained in conjunction with FIGS. 5–7. This device part 20, which can also be called a connection piece, is solidly joined to the elongated wiper blade in the middle region of the wiper blade. The connection piece 20 likewise has a substantially U-shaped cross section. Its base 50 of the U is platelike in embodiment (FIG. 6), and it is provided on the long sides with the two legs 52 and 54 of the U, which are spaced apart from one another. This creates a guide conduit 56 for receiving the wiper strip 22, provided with the support element 12, which together with the connection piece 20 form the wiper blade 10. One pivot peg 58 is disposed on each of the outsides, remote from one another, of the legs 52 and 54 of the U, in the region of one end of the base 50 of the U. As FIG. 5 in particular shows, the two pivot pegs 58 are divided in a plane that is parallel to the peg axis and perpendicular to the window. The result is accordingly one main peg part 60 and one supplementary peg part 62 each. The two main peg parts 60 are disposed solidly on their respective legs 52 and 54 of the U. On the face end 64, adjacent the main peg parts 60, of the platelike base 50 of the U, there are two U-shaped or hairpinlike extensions 66, 68 (FIG. 6), which are joined together via a middle piece 70. The hairpin legs 72, 74, 76, 78 are disposed in a common plane, which when the wiper blade is in operation is spaced apart from and approximately parallel to the window to be wiped. The apex regions 80 of the extensions 66, 68 face away from the base 50 of the U of the connection piece. While the two hairpin legs 74 and 76 adjacent to one another are solidly joined to the base 50 of the U via the middle piece 70. The two hairpin legs 72 and 78 facing away from one another are freely movable relative to the base 50 of the U. On their outsides, they are each provided with the pivot peg supplemental part 62 of the pivot pegs 58, which together with the main peg parts 60 disposed solidly on the long sides of the connection piece 20 produce the closed, circular peg cross section. This statement naturally leaves the dividing seam 82, which is present between the peg parts 60, 62 belonging to one another, out of consideration.

Figure 8:
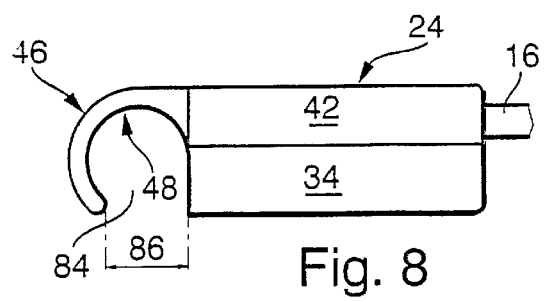
FIG. 8, a side view of the free end of the wiper arm, that is, the end provided with the device element, shown enlarged.
Figure 9:
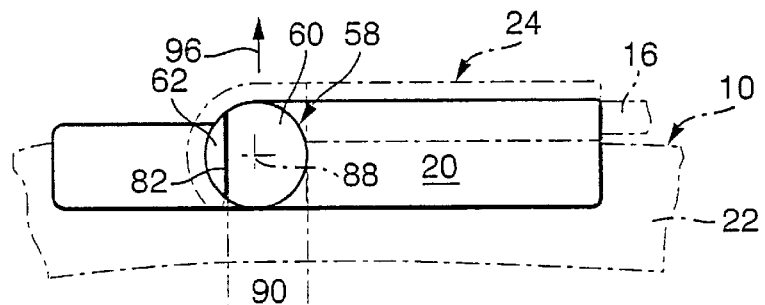
FIG. 9, an enlarged side view of the connection piece with the wiper blade represented by dot-dashed lines, and with the arrangement of FIG. 8, in the operating position.

Mounting of the wiper blade 10 on the wiper arm 16 or on the device element 24 belonging to the wiper arm and solidly joined to it will now be explained in conjunction with FIGS. 8–10. These figures are also helpful in explaining the structure of the two device elements 20 and 24 of the connection device 14, because they correspond substantially to FIGS. 2, 5 and 6. FIG. 8 shows that the inner contours of the bearing recesses 48 correspond to the walls of a bearing bore, which is open toward the window 85 to be wiped (FIG. 1) via a mounting channel 84. FIG. 8 also shows that the width 86 of the mounting channel 84 is less than the diameter of the bearing bore. From FIGS. 9 and 10, it can be seen that the two pivot pegs 58 have a common longitudinal axis 88; that is, the two pivot pegs are aligned with one another. Finally, it is clearly apparent from FIG. 9 that the two main peg parts 60 solidly joined to the legs 34 and 36 of the U of the connection piece 20 have a larger cross section than the two supplementary peg parts 62, which are seated on the outsides facing away from one another of the two outer hairpin legs 72 and 78. The dividing seam 82 between the two peg parts 60 and 62 that supplement one another is placed such that a width 90 of the main peg parts 60 results that is adapted to the width 86 of the mounting channels 84 in such a way that the main peg parts 60, without the supplementary peg parts 62, can pass through the mounting channels 84.

Figure 10:
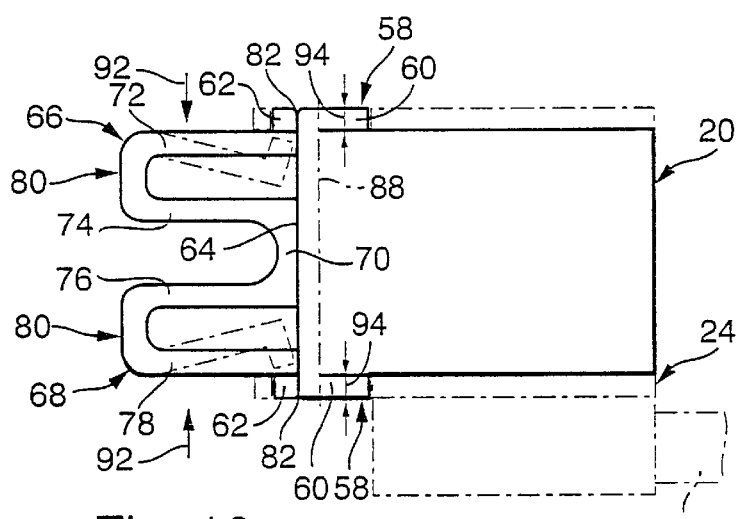
FIG. 10, a plan view on the arrangement of FIG. 9.

For connecting the wiper blade 10, 20 to the wiper arm 16, 24, first the outer hairpin legs 72 and 74 are urged in the direction of the two arrows 92, so that together with their supplementary peg parts 62 they deflect and approximately reach their position shown in dot-dashed lines in FIG. 10. It is entirely possible for the inner hairpin legs 74, 76 to be deflected toward one another as well. If the deflection of each supplementary peg part 62 is at least as great as the load-bearing peg length 94 (FIG. 10) that is operative in the gearing recesses, then it is possible for the wiper blade to be connected to the wiper arm 16, 24 (FIG. 8) in the direction of the assembly arrow 96 (FIG. 9). In the process, the two main peg parts 60 easily enter their gearing recesses 48 through their mounting channels 84 that are open toward the window 85. After that, the load acting in the direction of the arrows 92 (FIG. 10) is lifted, so that the hairpin legs 72 and 78—and optionally the legs 74 and 76 as well—resume their outset positions. Now the two supplementary peg parts 62 likewise engage the gearing recesses 48, which form pivot means of the wiper arm, so that the operating position of the connection device 14 shown in dot-dashed lines in FIG. 9—which corresponds to the detail marked IX in FIG. 1—in which position the wiper blade 10 is held in an operationally reliable way, since the pivot pegs 58 are engaged from behind, in the manner of an undercut, by the hooklike lengthened portions 46 of the legs 34, 36 of the U. The hairpin legs 72–78 thus form spring means, because the connection piece 20, with its two extensions 66, 68 joined integrally to it, is produced from a spring-elastic plastic. In this operating position of the wiper blade 10 that is now attained on the wiper arm 16, the base 32 of the U of the device element 20 is located on the side of the connection piece 20 away from the window, and its two legs 34, 36 of the U guidingly fit over the two long sides, provided with the pivot pegs 58, of the connection pieces 20 of the wiper blade, without causing any impairment in the pendulum motion of the wiper blade relative to the wiper arm in the joints 48, 58. To release the wiper blade 10 from the wiper arm 16, once again it suffices to urge the two hairpin legs 72 and 78 in the direction of the two arrows 92, until the two supplementary peg parts 62 resume their position shown in dot-dashed lines in FIG. 10. After that, the wiper blade can easily be released from the wiper arm counter to the directional arrow 96. This above-described embodiment of the invention is especially attractive from a practical standpoint and easy to manipulate.

Figure 11:
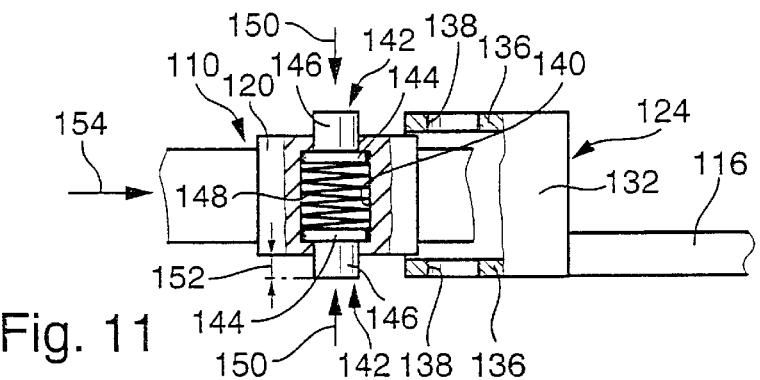
FIG. 11, a basic illustration of another embodiment of the connection device of the invention.

Another embodiment, shown in FIG. 11, especially illustrates the principle of the connection device of the invention. Once again, the wiper arm 116 has a device element 124 on its free end that is close in its construction to the device element 24 and that likewise has a base 132 of a U and two spaced-apart, parallel legs 136 of the U. Each of the two legs 136 is provided—in a departure from the version of FIGS. 2 and 8 with a bearing bore 138 closed all the way around, and the axes of the bores are aligned with one another. In its middle portion, the wiper blade 110 is provided with a blocklike connection piece 120, which has a transverse bore 140. This transverse bore 140 is narrowed at its two orifices. Two mushroom-shaped components 142 are disposed in the transverse bore 140, with the caps 144 of the mushrooms located adjacent one another and the two bases 146 of the mushrooms protruding through the narrowest points of the transverse bore 140 and forming pivot pegs, whose diameter is adapted to the diameter of the bearing bores 138. A helical compression spring 148 is disposed in prestressed fashion in the transverse bore 140 between the two caps 144 of the mushroom, so that the pivot pegs 146 assume the positions shown in FIG. 11. In order to connect the wiper blade 110, 120 to the wiper arm 116, 124, the two pivot pegs 146 must be urged in the direction of the two arrows 150 in such a way that counter to the prestressing force of the helical compression spring 148, they are moved toward one another, by at least the amount of the effective peg length 152. After that, the wiper blade can be introduced with its blocklike connection piece 120 between the legs 136 of the U of the device element 124, until the common longitudinal axis of the two pivot pegs 146 is aligned with the longitudinal axis of the two bearing bores 138. If the load in the direction of the two arrows 150 is then eliminated, the prestressed helical compression spring 148 presses the two pivot pegs 146 into their bearing bores 138 of the wiper arm, so that a simple, effective pivot connection between the wiper blade and the wiper arm 116 is achieved.

It is a common feature of both exemplary embodiments that each pivot peg 62 and 146 is movable at least in some portions (supplementary peg part 62) counter to spring force by at least the amount of the effective peg length 94 and 152, respectively, toward the other pivot peg and can be introduced into the gearing recess 48 and 138, respectively, associated with it.

What is claimed is:

1. A device for connecting an elongated wiper blade for motor vehicle windows to a wiper arm guided on the wiper blade, is movable between turning point positions, and is provided with a device element, with whose device element (24) the elongated wiper blade (10) pressable against the window with a wiper strip (22), is pivotably connected via a connection piece (20) belonging to the wiper blade, wherein one pivot peg (58, 146) disposed on the connection piece protrudes from each long side of the wiper blade, a common longitudinal axis of the two pivot pegs is located transversely to a length of the wiper blade in a plane spaced apart from the window, and each of the pivot pegs engages a gearing recess, associated with it, of the device element, which gearing recess forms pivoting means of the wiper arm, characterized in that at least one pivot peg is movable at least in some portions by at least its peg length toward the other pivot peg counter to spring force and can be introduced into the gearing recess (48, 138) associated with it.

2. The device of claim 1, that the at least one pivot peg (58) is longitudinally divided; that one peg part (60) of the at least one pivot peg is solidly joined to the connection piece (20); that the other peg part (62) of the at least one pivot peg is movable counter to spring force by at least an amount of an effective peg length (94) toward the other pivot peg; and that the pivot peg part (60) solidly joined to the connection piece can be introduced, via a mounting channel (84) that is open and discharges into the gearing recess (48) associated with this pivot peg part, and a width (86) of the mounting channel is adapted to a width (90) of that pivot peg part (60).

3. The device of claim 2, characterized in that when the wiper arm (16) is in an operating position, a dividing seam (82) existing between the first pivot peg part (60) and the second pivot peg part (62) is disposed upright toward the window.

4. The device of one of claim 2, characterized in that a dividing seam (82) is disposed between the peg parts and lies outside a longitudinal axis (88) of the pivot peg; that the pivot peg part (60) having a larger cross section is solidly-joined to the connection piece (20), and the pivot peg part (62) having a smaller cross section is disposed in at least approximately resiliently yielding fashion in a direction of the longitudinal axes (88) of the pegs.

5. The device of claim 4, characterized in that the connection piece (20) is made from a spring-elastic plastic; and that spring means (66, 68) are disposed on an end (64), which when the wiper blade is connected to the wiper arm is remote from the wiper arm (16), of a base part that belongs to the connection piece (20) and has the pivot peg parts (60) having the larger cross section.

6. The device of claim 5, characterized in that the spring means for each of the smaller pivot peg parts (62) are formed each by one hairpin shaped extension (60, 68) of the connection piece (20); that two extensions (60, 68) are located in a common plane spaced apart from and approximately parallel to the window; that inner hairpin legs (74, 76), adjacent to one another, of the two extensions (60, 68) are joined solidly, by their ends remote from respective apex region (80) of the hairpin, to an end of the base part of the connection piece; and that the pivot peg parts (62) having the smaller cross section are each disposed on one of two outer legs (72, 78) of the hairpin of the two extensions, which legs are freely movable counter to spring force.

7. The device of claim 2, characterized in that the device element (24) of the wiper (16) has a U-shaped cross section, a base (32) of which U, when the wiper blade has been connected, is located on a side of the connection piece (20) remote from the window; that two legs (34, 36) of the device element (24) fit tightly over two long sides of the connection piece (20) of the wiper blade; and that each leg of the U has one gearing recess (48) for one pivot peg (58).

8. The device of claim 7, characterized in that a mounting channel (84) of each gearing recess (48) is open toward the window.

9. The device of claim 8, characterized in that when the wiper blade (10) has been connected, walls of the gearing recess that are each remote from the wiper arm (16) fit in hook fashion under the pivot pegs (58).

10. The device of claim 7, characterized in that the base of the U of the device element (24) is provided with a widened portion (38) of L-shaped cross section, one leg (40) of which L is formed by a continuation of the base (32) of the U, while the other leg (42) of the L is disposed spaced apart from and parallel to the first leg (34) of the U of the device element (24).

* * * * *